Patented Jan. 3, 1939

2,142,957

UNITED STATES PATENT OFFICE 2,142,957

OIL-SOLUBLE BISMUTH SALT AND PROCESS OF PRODUCING IT

Horace A. Shonle and John H. Waldo, Indianapolis, Ind., assignors to Eli Lilly and Company, Indianapolis, Ind., a corporation of Indiana No Drawing. Application January 28, 1937,
Serial No. 122,826

9 Claims. (Cl. 260—447)

Our invention relates to certain oil-soluble basic bismuth salts of carbalkoxy acetic acids in which the alkoxy group has not be exceed 4 carbon atoms and in which one only of the two hydrogen atoms on the α-carbon atom is replaced by a monovalent primary aliphatic hydrocarbon radical having not less than 5 carbon atoms, the other of said two hydrogen atoms still being present; to the processes to producing such salts; and to oil solutions of such salts. By monovalent primary acyclic aliphatic hydrocarbon radical we mean a noncyclic radical in which the attaching carbon atom is joined to only one other carbon atom of the radical.

Such oil-soluble bismuth salts are found to be effective spirocheticidal agents, as on intramuscular administration.

We are not certain of the complete structural formula of these salts, but whatever it is the salts are basic bismuth salts of an acid represented by the following formula:

(1) 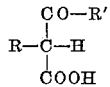

in which R represents a monovalent primary aliphatic radical having at least 5 carbon atoms and R' represents an alkoxy group having not to exceed 4 carbon atoms.

The monovalent primary aliphatic radical may be either saturated or unsaturated, and either may be a straight-chain radical or may have one or more branches so long as the radical is kept a primary radical. Examples of such primary aliphatic radicals include the following:

Iso-amyl 

2-ethyl-butyl       $CH_3-CH_2-\overset{\overset{CH_3}{|}}{\underset{|}{CH_2}}-CH_2-$ 2-methyl-pentyl     $CH_3-CH_2-CH_2-\overset{CH_3}{\underset{|}{CH}}-CH_2-$ 2,4-dimethyl-pentyl $CH_3-\overset{CH_3}{\underset{|}{CH}}-CH_2-\overset{CH_3}{\underset{|}{CH}}-CH_2-$ 2-eythyl-hexyl      $CH_3-CH_2-CH_2-CH_2-\overset{\overset{CH_3}{|}}{\underset{|}{CH}_2}-CH_2-$ Decyl               $CH_3-(CH_2)_8-CH_2-$ Dodecyl (lauryl)    $CH_3-(CH_2)_{10}-CH_2-$ Octadecyl           $CH_3-(CH_2)_{16}-CH_2-$ 9,10-octadecenyl    $CH_3-(CH_2)_7-CH=CH-(CH_2)_7-CH_2-$ In preparing these bismuth salts, we proceed in general as follows:

One mol of a mono-substituted malonic ester which contains the desired monovalent primary aliphatic radical, formed in any usual manner, is carefully half-saponified, in the cold, by the addition of 1 mol of an alkali-metal hydroxide, as of sodium or potassium, in alcohol. This converts the mono-substituted malonic ester into the sodium salt of the corresponding mono-substituted carbalkoxy acetic acid, which if the malonic ester is the ethyl malonate has the following formula:

(2) $$\begin{array}{c} COOC_2H_5 \\ | \\ R-C-H \\ | \\ COONa \end{array}$$

The alcohol is removed practically completely by evaporation in vacuo, and water is added to dissolve said sodium salt. Any unsaponified mono-substituted malonic ester separates out as an oily liquid, and may be readily removed from the water solution by extraction, as with ether.

The sodium salt thus obtained, or the corresponding acid obtained from it, is caused to react in any suitable manner with any freshly prepared bismuth compound which is soluble in a water solution of glycerol and in which bismuth is the cation—for instance, bismuth sub-nitrate or bismuth hydroxide. We prefer bismuth sub-nitrate, because the procedure is then most simple, in that it facilitates the reaction and avoids the necessity for heating.

When using bismuth sub-nitrate as the bismuth compound, we prefer the following procedure:

To a water solution of the sodium salt of the mono-substituted carbalkoxy acetic acid is added a molecular equivalent of the bismuth sub-nitrate, in a water solution containing in sufficient quantity any polyhydroxy alcohol which aids in holding said bismuth sub-nitrate in solution in the water; for which purpose we have found that either glycerol or mannitol is very suitable. A reaction occurs immediately, and without the necessity for heating; and by that reaction the desired basic bismuth salt of the carbalkoxy acetic acid of Formula 1 is formed. If the mono-substituted malonic ester used is the ethyl ester, which we prefer, R' is the ethoxy group.

This product is extracted from the composite reaction mixture with benzene or ether; the solvent is then driven off from the extract so obtained, by evaporation in vacuo; and the residue remaining is ready for solution in whatever oily menstruum it is desired to use it.

If bismuth hydroxide is the initial bismuth compound used, the preferred procedure is slightly different:

In this instance, the water solution of the sodium salt of the mono-substituted carbalkoxy acetic acid is acidified with a mineral acid, such as hydrochloric acid, to produce the acid itself.

This may be separated from the remaining water solution (which contains the sodium salt of the mineral acid that was added, such as sodium chloride), in any suitable manner; as in a separatory funnel, because the two things form separate layers, or more desirably by the extraction of the mono-substituted carbalkoxy acetic acid with ether. The ether is removed by evaporation in vacuo, and desirably at low temperature, to leave the mono-substituted carbalkoxy acetic acid. This is mixed with bismuth hydroxide, and the mixture is heated for several hours in the presence of a small amount of water, to form the desired basic bismuth salt of the carbalkoxy acetic acid of Formula 1, with the ethoxy group as R' as before if the mono-substituted malonic ester used is the ethyl ester.

It is to avoid the necessity for this heating that the procedure using bismuth sub-nitrate is deemed preferable.

In either procedure, the residue, which is the desired basic bismuth salt of the carbalkoxy acetic acid of Formula 1, may be used to form an oily solution, as by being simply dissolved in the selected oil. Such an oily solution is suitable for intramuscular administration.

Various oils may be used for this purpose, provided they are liquid at body temperature. These include any bland mineral oil, and most vegetable oils. Mineral oil is more suitable for the higher members of the series, with R having at least 8 carbon atoms, because the lower members of the series are usually insufficiently soluble in mineral oil to give a therapeutic dose in a conveniently administrable dose of such mineral oil. The vegetable oils are preferably those which have an unsaturation that is due in the most part to the presence of oleic acid—that is, which have a larger percentage of oleic acid than the combined percentages of linoleic and linolenic acids. Among them may be mentioned olive oil, cottonseed oil, cocoanut oil, and sesame oil. But we have found it most advantageous to use an alkyl oleate, or an alkyl ester of the fatty acids of any of the above-described vegetable oils, and most particularly ethyl oleate or the ethyl ester of the fatty acids of sesame oil.

The following are examples of basic bismuth salts of carbalkoxy acetic acids, embodying our invention, and of the processes by which such salts are made:

*Example 1*

We half-saponify 315 gms. of 2-ethyl-hexyl ethyl malonate, by treating it with an ice-cold solution of 46.2 grams of sodium hydroxide dissolved in 555 cc. of 90% ethyl alcohol. The reaction mixture is allowed to stand in the icebox over night. This converts the 2-ethyl-hexyl ethyl malonate into its corresponding mono-sodium salt, which has the following formula:

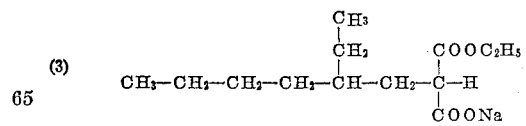

We now remove the alcohol by evaporation in vacuo, and add sufficient water to dissolve the sodium salt. There is usually some unsaponified 2-ethyl-hexyl ethyl malonate remaining, which separates as an oily liquid from the water solution of the sodium salt and may readily be removed therefrom by extraction with ether.

If desired, and for one variation of our method it is necessary, we may convert this sodium salt into the half-ester itself. We do this by adding a mineral acid, most conveniently hydrochloric acid, until no further separation of an oily liquid occurs. The oily liquid, which rises to the top, is the desired half-ester; which has the same formula as the sodium salt of Formula 3 save that it has a hydrogen atom instead of the sodium atom of that formula.

We can use either the half-ester or the sodium salt for the further procedure.

When we use the sodium salt we proceed as follows: To 500 cc. of water we add 74 grams of hydrated bismuth nitrate, Bi(NO$_3$)$_3$·5H$_2$O; which forms bismuth sub-nitrate as a precipitate that is recovered by filtration. This sub-nitrate, while still moist, is immediately dissolved in a solution of about 59 gms. of mannitol in about 475 cc. of water. Instead of the mannitol we may use about 100 cc. of glycerol. To the solution thus formed is added enough of the aforesaid solution of said sodium salt to introduce 32.7 gms. of said sodium salt. A reaction occurs substantially immediately, in the cold, with the formation of a precipitate; although as a precaution we usually let the reaction mixture stand for a short time. The precipitate, which in this instance is a semi-solid mass, is recovered by extraction with ether or benzene; the extract is filtered; and the extracting solvent is then driven off by evaporation in vacuo, and the residue dried to substantially constant weight. This residue is the desired basic bismuth salt of 2-ethyl-hexyl carbethoxy acetic acid.

When we use the half-ester, we proceed as follows: To 30 gms. of the half-ester we add 32 gms. of bismuth hydroxide, preferably freshly prepared, moisten the mixture with about 5 cc. of water, and heat the whole on a water bath under a reflux condenser for about 10 hours. As the reaction progresses a brown color is developed; and the solid bismuth hydroxide slowly disappears as such, to form the desired basic bismuth salt of 2-ethyl-hexyl carbethoxy acetic acid. This salt is suitably extracted from any unreacted material, as with ether or benzene; the extract is filtered; and the extracting solvent is removed and the salt is dried as already described.

The basic bismuth salt of 2-ethyl-hexyl carbethoxy acetic acid as thus obtained, by either variant of our method, is sufficiently pure for therapeutic use. As first obtained, it is a very viscous transparent liquid, of a general amber color. It is readily soluble in ether, in benzene, and in the vegetable and mineral oils above mentioned; but it is not very soluble in alcohol, and is substantially insoluble in water.

*Example 2*

We use the process of Example 1, save that instead of 2-ethyl-hexyl ethyl malonate as an initial compound there are substituted equivalent amounts of isoamyl ethyl malonate, 2-ethyl-butyl ethyl malonate, 2-methyl-pentyl ethyl malonate, 2,4-dimethyl-pentyl ethyl malonate, decyl ethyl malonate, dodecyl ethyl malonate, octadecyl ethyl malonate, or 9,10-octadecenyl ethyl malonate. In each instance, as well as when using the 2-ethyl-hexyl malonate, we prefer that the malonate be the ethyl malonate, as stated; but we may use instead the methyl malonate, the propyl malonate, or the butyl malonate.

The final basic bismuth salts obtained are all oil-soluble salts, which are also soluble in ether or benzene. In some instances, as in the cases of the isoamyl salt and the 2-ethyl-butyl salt, the final products are solid; but in most other instances they are obtained as viscous liquids.

We claim as our invention:

1. An oil-soluble bismuth salt of a carbalkoxy acetic acid in which one of the two hydrogen atoms on the α-carbon atom is still present and the other of said two hydrogen atoms is replaced by a monovalent primary acyclic aliphatic hydrocarbon radical having at least 5 carbon atoms and the alkoxy group has not to exceed 4 carbon atoms.

2. The process of producing an oil-soluble bismuth salt of a carbalkoxy acetic acid in which one of the two hydrogen atoms on the α-carbon atom is still present and the other of said two hydrogen atoms is replaced by a monovalent primary acyclic aliphatic hydrocarbon radical having at least 5 carbon atoms and the alkoxy group has not to exceed 4 carbon atoms, which consists in half-saponifying a mono-substituted malonic ester which contains the said monovalent primary aliphatic hydrocarbon radical by the addition of an alkali-metal hydroxide in alcohol, separating the alkali-metal salt thus obtained of the mono-substituted carbalkoxy acetic acid, and reacting between a compound of the class consisting of said alkali-metal salt and its corresponding mono-substituted carbalkoxy acetic acid with a freshly-prepared bismuth compound which is soluble in a water solution of glycerol and in which bismuth is the cation.

3. The process of producing on oil-soluble bismuth salt of a carbalkoxy acetic acid in which one of the two hydrogen atoms on the α-carbon atom is still present and the other of said two hydrogen atoms is replaced by a monovalent primary acyclic aliphatic hydrocarbon radical having at least 5 carbon atoms and the alkoxy group has not to exceed 4 carbon atoms, which consists in half-saponifying a mono-substituted malonic ester which contains the said monovalent primary aliphatic hydrocarbon radical by the addition of an alkali-metal hydroxide in alcohol, separating the alkali-metal salt thus obtained of the mono-substituted carbalkoxy acetic acid, and treating a water solution of such alkali-metal salt with a solution of bismuth sub-nitrate.

4. An oil-soluble bismuth salt of a carbalkoxy acetic acid in which one of the two hydrogen atoms on the α-carbon atom is still present and the other of said two hydrogen atoms is replaced by the 2-ethyl-hexyl group and the alkoxy group has not to exceed four carbon atoms.

5. An oil-soluble bismuth salt of a carbalkoxy acetic acid in which one of the two hydrogen atoms on the α-carbon atom is still present and the other of said two hydrogen atoms is replaced by the dodecyl group and the alkoxy group has not to exceed four carbon atoms.

6. An oil-soluble bismuth salt of a carbalkoxy acetic acid in which one of the two hydrogen atoms on the α-carbon atom is still present and the other of said two hydrogen atoms is replaced by the octadecyl group and the alkoxy group has not to exceed four carbon atoms.

7. An oil-soluble bismuth salt of 2-ethyl-hexyl-carbethoxy acetic acid.

8. An oil-soluble bismuth salt of dodecyl-carbethoxy acetic acid.

9. An oil-soluble bismuth salt of octadecyl-carbethoxy acetic acid.

HORACE A. SHONLE.
JOHN H. WALDO.